United States Patent [19]

Thebault

[11] 4,451,141

[45] May 29, 1984

[54] AUTOMATIC DEVICE FOR THE SIMULTANEOUS PRINTING AND DEVELOPMENT OF PHOTOGRAPHS

[75] Inventor: Claude Thebault, Meylan, France

[73] Assignee: Kis France, Grenoble, France

[21] Appl. No.: 366,074

[22] Filed: Apr. 6, 1982

[30] Foreign Application Priority Data

Apr. 15, 1981 [FR] France ................................ 81 07737

[51] Int. Cl.³ ............................................. G03B 29/00
[52] U.S. Cl. ....................................... 355/28; 355/29; 355/32
[58] Field of Search ......................... 355/27, 28, 29, 32

[56] References Cited

U.S. PATENT DOCUMENTS

| 162,759 | 5/1875 | Marcy | 362/293 |
|---|---|---|---|
| 893,396 | 7/1908 | Stephenson | 355/28 |
| 1,157,611 | 10/1915 | Beidler | 355/28 |
| 2,430,687 | 11/1947 | Sabel et al. | 355/27 |
| 2,552,250 | 5/1951 | Eornemann et al. | |
| 3,308,717 | 3/1967 | Okishima et al. | 355/28 |
| 3,335,636 | 8/1967 | Atkinson | 355/27 |
| 3,557,675 | 1/1971 | Koll et al. | 355/27 |
| 4,050,807 | 9/1977 | Barbieri | 355/32 |
| 4,185,912 | 1/1980 | Schwartz . | |

FOREIGN PATENT DOCUMENTS

| 842062 | 9/1976 | Belgium . | |
| 562144 | 8/1958 | Canada | 355/28 |
| 0011850 | 6/1980 | European Pat. Off. . | |
| 0028148 | 5/1981 | European Pat. Off. . | |
| 1138876 | 2/1957 | France . | |
| 1545315 | 9/1968 | France . | |
| 156148 | 7/1932 | Switzerland . | |

OTHER PUBLICATIONS

French Patent Application 81/06900 which corresponds to U.S. application Ser. No. 362,121.

Primary Examiner—Monroe H. Hayes
Attorney, Agent, or Firm—Parkhurst & Oliff

[57] ABSTRACT

An integrated automatic device for the simultaneous printing and development of photographs, particularly color photographs, of the type comprising three separate units adjoining each other, namely a first exposure unit A, a second dark-room unit B, a third development unit C. The dark-room unit B is vertical and perpendicularly adjoins the end of the exposure unit A and the development unit C is horizontal and is located below the dark-room unit B and parallel to the exposure unit A.

5 Claims, 6 Drawing Figures

AUTOMATIC DEVICE FOR THE SIMULTANEOUS PRINTING AND DEVELOPMENT OF PHOTOGRAPHS

BACKGROUND

The present invention concerns an integrated automatic device for the simultaneous printing and development (with optional individual treatment) of photographs and particularly color photographs.

Most frequently, the printing, development and cutting of photographs are effected in distinct separate phases, which requires a large number of operations and results in substantial delays.

Consequently, at the present time it is barely possible economically to simultaneously print and develop photographs upon demand and to do so within a short period of time and have the option of individual processing.

Automatic devices for the simultaneous printing and development of photographs are already known, such as those disclosed in European Pat. Nos. 0011850 and 0028148, Belgian Pat. No. 842 062 and U.S. Pat. No. 4,185,912. However, these solutions, which are essentially adapted to the processing of black and white photographs, are complicated, bulky and unsatisfactory for the industrial development of color photographs.

Such automatic apparatus essentially comprise the following three main units:

a first unit referred to as the exposure unit which comprises the lamp, the filtering system. the frame intended to receive the film to be reproduced, the enlargement lens and a shutter;

a second dark-room unit containing the sensitive paper, the means for the transport of the paper, a plane on which the image which is to be reproduced (coming from the lens) is projected, and a cutter;

a third unit referred to as the development unit which contains a series of development baths and means for advancing the exposed paper within said bath.

The apparatus described in Belgian Pat. No. 842 062, and in European Pat. No. 0011 850, comprises a single housing in which the exposure unit is vertically oriented and arranged on a horizontal frame which comprises the dark-room unit and the development unit in series. As a result of the single housing, changing of the cartridge of sensitive paper or changing of the exposure unit is always difficult and cannot be accomplished without interrupting the development process. Furthermore, this housing is still bulky and of substantial height. Therefore, these apparatus, which are adapted to process black and white photographs, lack versatility and flexibility for the processing of color photographs.

SUMMARY OF THE INVENTION

The present invention overcomes these drawbacks. It concerns an automatic integrated device for the simultaneous printing and development upon demand of photographs, in particular color photographs, which is versatile in use since it can process all types of films of very different dimensions and in different forms of presentation without it being necessary to sort these films or have recourse to specialists.

This integrated automatic device for the simultaneous printing and development of photographs, particularly color photographs, comprises:

a first "exposure" unit A comprising an exposure lamp, a subtractive filtering system, a frame intended to receive the film to be reproduced, an enlargement lens and a shutter;

a second "dark-room" unit B comprising a member for the feeding of sensitive paper, a member for the advancing of said sensitive paper, a plane on which the image to be reproduced which comes from the lens is projected onto the paper, and a cutter;

a third "development" unit C, comprising means for feeding the cut exposed sheet of paper, a series of development baths and a drying section, and means adapted to advance the cut, exposed sheet to these different processing sections and through the drying section, and is characterized by the fact that:

the dark-room unit B is vertical and is perpendicularly adjacent to the end of the exposure unit A, and the development unit C is horizontal and is located below the dark-room unit B and is parallel to the exposure unit A.

Advantageously, each unit A, B or C can be separated from the unit which adjoins it, and the horizontal exposure unit A opens into the vertical black box unit B at the level of the plane onto which the image to be reproduced is projected.

BRIEF DESCRIPTION OF THE DRAWINGS

The manner of implementing the invention and the ensuing advantages will be better understood in relation to the following illustrative example and the attached figures, without thereby implying any limitation.

For convenience in drawing, FIG. 6 is somewhat of a composite view as (looking from left to right) a cross section of tank 120 taken through the center of unit 130 is shown while an external view of the tank 121 of this unit is depicted and, finally, the tank 122 and the drive system is shown.

DETAILED DESCRIPTION

Figure 1:
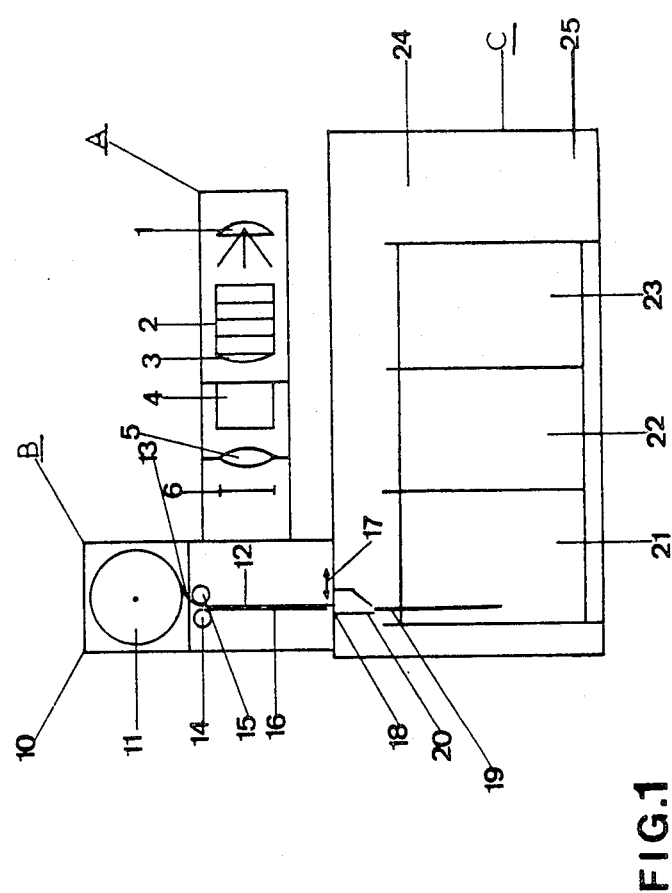
FIG. 1 is an overall diagrammatic representation of an automatic integrated printing and development device in accordance with the invention.

Referring to FIG. 1, the automatic integrated printer-development device of the invention comprises three units A, B, C.

The first horizontal unit A, referred to as the "exposure" unit, comprises and exposure lamp 1, a subtractive filter 2 comprising three adjustable complementary unit filters having a diffuser 3 associated therewith, a frame 4 adapted to receive the film to be printed, an enlargement lens 5, and a shutter 6.

The second vertical unit B, the dark-room unit, is positioned perpendicular to the first unit A and comprises a light-tight cartridge 10 containing a rotary roll 11 of sensitive paper 12 which leaves the cartridge through a felt-lined slit 13 so as to assure light imperviousness, a member for advancing said paper 12 comprising of two pressure drive rollers 14,15, a plate 16 on which the image to be reproduced coming from the lens 5 is projected, a horizontal guillotine cutter 17, forming a cutter in conjunction with a fixed part which is located below the plate 16, and an orifice 18 through which the cut exposed sheet 19 exits.

The third horizontal unit C, referred to as the "development" unit, is perpendicular to and below unit B and parallel to unit A. Unit C comprises a funnel 20 located just below the orifice 18, three processing tanks containing the developing agent 21, the bleaching-fixing agent 22, and the washing agent 23, a drying section 24, a receptacle 25 intended to receive the finished photo, and known means not illustrated in FIG. 1 but shown in detail in FIG. 6 adapted to advance the cut exposed sheet 19 in the different processing sections 21-24. An example of such known means is disclosed in French Pat. No. 1,545,315.

Figure 2:
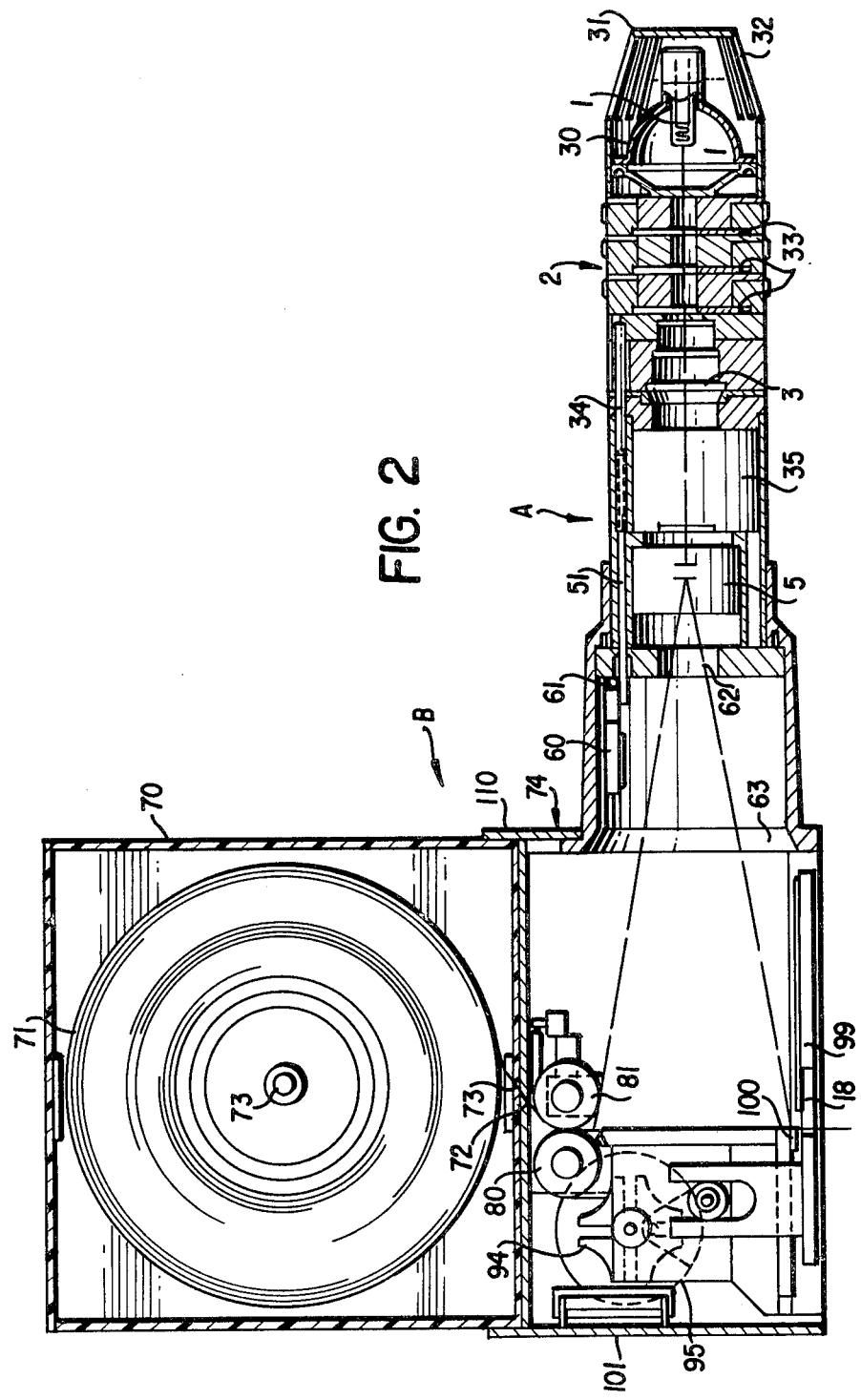
FIG. 2 is a cross sectional view of a portion of an embodiment of the invention revealing the first "exposure" unit A and the second "dark-room" unit B which is perpendicular to the first unit.
Figure 3:
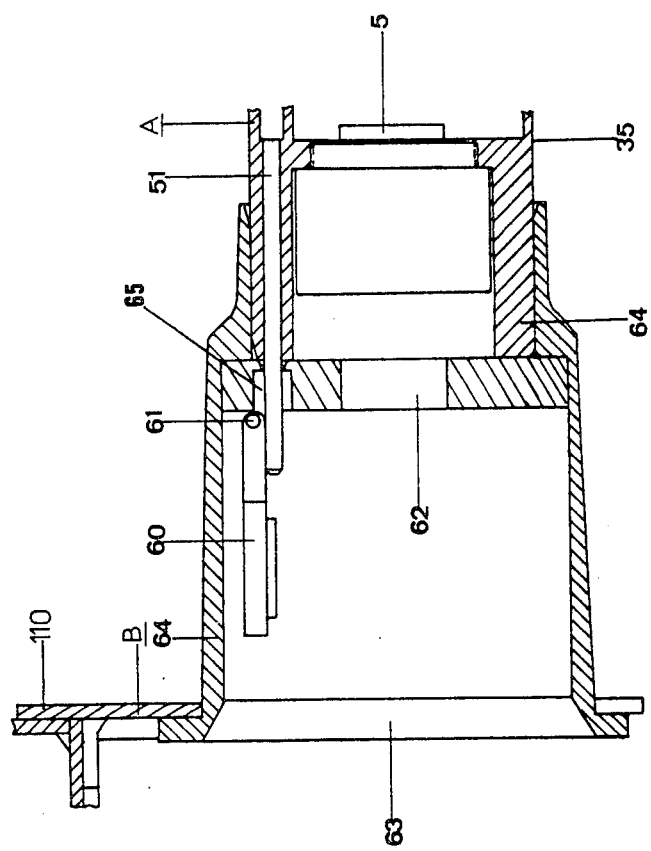
FIG. 3 is a cross sectional view showing the fitting of the first unit A on the second unit B.

Referring now to FIGS. 2 and 3, the horizontal exposure unit A is shown in greater detail. Beginning from the right in FIG. 2, a lamp 1,30, which may be for example, a Sylvania (trademark) 100 watt quartz-halogen lamp, is covered by an aluminum hood 31 within which aeration slots 32 are provided. Lamp 1,30 emits light into a filtering unit 2 formed of three subtractive unit filters 33 which are more particularly described in the Applicant's French Pat. Application No. 81 06 900 of Apr. 3, 1981 entitled "Subtractive filter for the printing of color photograph film" which is incorportated herein by reference. Filter unit 2, which is associated with the diffuser 3, has, to the left as seen in FIG. 2, pins 34, two of which may be utilized to secure filter unit 2 to the view-carrier device 4 as well as to make provision for means for the passage of electric current to the lamp 1,30. A secondary unit comprising a view-carrier device 35, is located behind (to the left as seen in FIG. 2) the diffuser 3 and is adapted to position the negative film to be reproduced. In practice, in order to eliminate adjustments, view carrier 35 is associated with the optical enlargement unit consisting of lens 5 and shutter 6. With such an arrangement, rather than adjusting the respective position of the lens and the negative film as a function of the dimensions of the latter essentially three "pluggable" or removably insertable subassemblies are utilized which correspond to the main dimensions of negative films. They are: (1) size 125, i.e. 35×36; (2) size 126, i.e. 28×28; and (3) size 110, i.e. 13×17. Secondary sub-unit 35 has traversing pins 51 which provide two functions: firstly, the pins 51 fasten the view carrier 35 to the dark-room unit B and, secondly, the pins 51 permit passage of electric current by forming (shown at the right end as illustrated in FIG. 2) jacks for the pins 34 of the first sub-unit. The left ends (as seen in FIG. 3) of pins 51 engage in conductive orifices 65 at the end 64 of the vertical unit B.

The lens 5 is designed especially for the enlargement selected and is associated in conventional manner with a shutter 6, which is not shown in FIGS. 2 and 3.

The dark-room unit B referred to above and shown in FIGS. 2, 3 and 5 will now be described in greater detail. Second vertical unit B, which is perpendicular to the first unit A, comprises a light-tight housing 70, made, for example, of molded plastic, containing a roll 71 of sensitive paper 72 which is rotatable around a pin 73.

The sensitive paper 72 emerges from the housing 73 by means of a suitable slit 13 covered on its two lips with a velvet fabric to thereby assure the light imperviousness of the housing 70. One superior embodiment of the housing 70 and roll 71 unit is described in the Applicant's French Patent Application No. 81 06 901 filed Apr. 3, 1981 entitled "Package for roll of sensitive paper for photographic printing".

A frame 74 is positioned below the housing 70. The top portion of frame 74 has rims 110 adapted to wedge the housing 70, and a slit 73 (FIG. 5) coinciding with the slit 13 for the passage of the paper 72. The bottom portion of frame 74 has an orifice 18 (shown in FIG. 5) coinciding with a funnel 113, (designated by the numeral 20 in FIG. 1) placed on the top of the horizontal development unit C for the passage of the cut, exposed sheet of paper 19.

Referring now to FIG. 3, on the side of unit B is a nose-shaped protuberance 64 (which protrudes toward unit A) into which the exposure unit A is "plugged" onto pins 51, and within which is placed the shutter 60 (shown in FIG. 3), which is pivotable at hinge 61.

The sheet 72, which has come from the housing 70, passes through the slit 13 and then through the slit 73 (provided in the top of the frame 74 in coincidence with the slit 13) and is then taken up by the paper transport and cutting member 99 located within the dark-room (see FIG. 5) which essentially comprises (see FIGS. 2, 4 and 5) two rubber-covered rollers 80, 81, the circumferences of which correspond to the length of paper to be delivered. The two rollers 80, 81 are pressed against each other and held by a conventional spring 83. The roller 81 can be disengaged by conventional means in order to facilitate the introduction of the sheet of paper 72.

Located along the axis of the vertical center line between these two rollers 80,81 is a resting plate 85, made for example of steel or magnesium, upon which the sensitive paper 72 is pressed during the exposure to the image projected onto a plate 85 through the lens 5.

Figure 4:
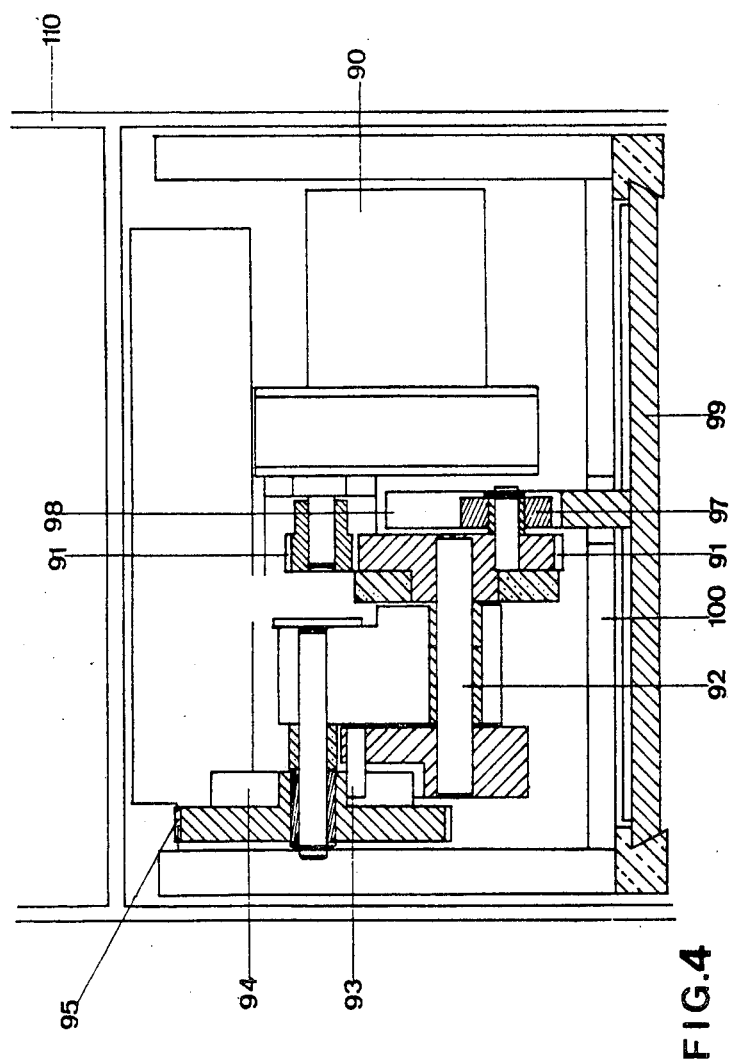
FIG. 4 is a cross sectional view of the paper advance system, i.e., the member for the advancing of the sensitive paper, taken along the axis of the motor.
Figure 5:
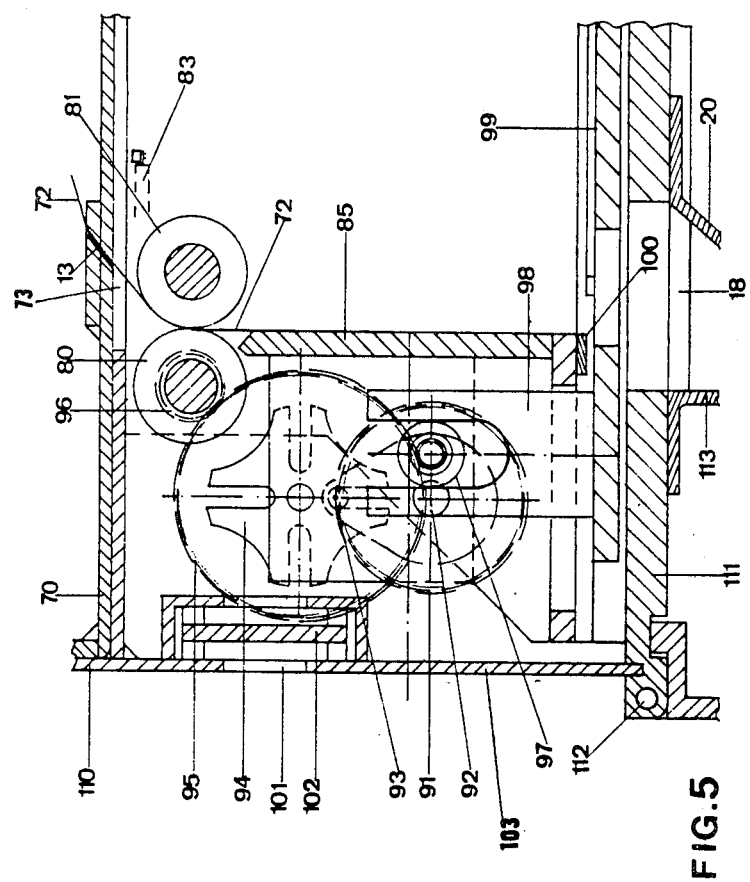
FIG. 5 is a side view of the paper advance system.

Referring now to FIGS. 4 and 5, a motor-reducer motor 90 having a horizontal drive shaft rotationally drives a pinion transmission 91 which performs two functions, as seen in FIG. 4. Firstly, pinion transmission 91 rotates a horizontal shaft 92 which drives a crank pin 93 positioned on an axis parallel to shaft 92. Pin 93 engages a four-arm Maltese cross 94 which is perpendicular to the crank pin 93 and is rigidly fastened to a pinion 95 that engages another pinion 96 mounted on the shaft of the pressure drive roller 80 (as shown in FIG. 5), thereby operating to advance the sensitive paper 72. Secondly, pinion transmission 91 has mounted therein a roller 97 which drives a U-shaped fork 98 (as shown in FIG. 5) rigidly connected to the movable blade 100 positioned at the end of the resting plate 85 to form a cutter.

When the motor 90 is rotating, it rotates the crank pin 93, which, therefore, causes the Maltese cross 94 to pivot. Since the diameter of the pinion 95 is four times greater than the diameter of the pinion 96 of the drive roller 80, when the Maltese cross 94 turns one-quarter of a revolution (displacement from one arm to the next) the drive roller 80 rotates one revolution and, therefore, delivers the predetermined length of sensitive paper 72.

During one cycle, i.e. one revolution of the shaft 92 of the motor 90 (see FIGS. 4 and 5), firstly the crank pin 93 engages in the groove of the Maltese cross 94 and thus pivots said Maltese cross by a quarter of a revolution, which through a multiplication effect causes the pinion 80 to turn, therefore advancing the paper 72 by a predetermined length which corresponds to the periphery of the pinions 80,81.

Secondly, during the same period of time, the roller 97 completes a circular revolution and thus also drives the U-shaped fork 98 (by sliding within the "U") which is rigidly connected with the movable blade 99 to thereby provide a horizontal reciprocating movement.

In brief, for one revolution of the motor 90, the paper 72 is advanced during the first quarter revolution, while during the entire revolution blade 99 is reciprocated.

In order to avoid having the end of the paper which has been cut by the blade 99 adhere momentarily to blade 9, the blade 99 is driven through an additional stroke to detach the cut paper.

Referring now to FIG. 5, the dark-room unit B comprises an air intake 101 adapted to facilitate ventilation within the exposure zone and avoid condensation. Air intake 101 is associated with a plate 102 which forms a baffle to preclude the entrance of light. An orifice 18 is aligned with the stationary blade 100.

As has been previously stated, a shutter 60, which is pivotable at hinge 61 enables the assurance of the light imperviousness of the dark-room B when the view carrier 35 is removed, i.e., upon removal of either the exposure unit or the view carrier sub-unit (see FIG. 3).

The beam of light coming from the source of light 1 passes through the lens 5 and then through an orifice 62 rigidly secured to unit B so as to penetrate through the opening 63 into the vertical dark-room unit. Referring now to FIG. 3, the protrusion 64 is formed by a projection of the frame 74 and is positioned so that the horizontal exposure unit (A) is held by the pins 51 in the orifices 65 provided in the plate 62 (see FIG. 3).

Figure 6:
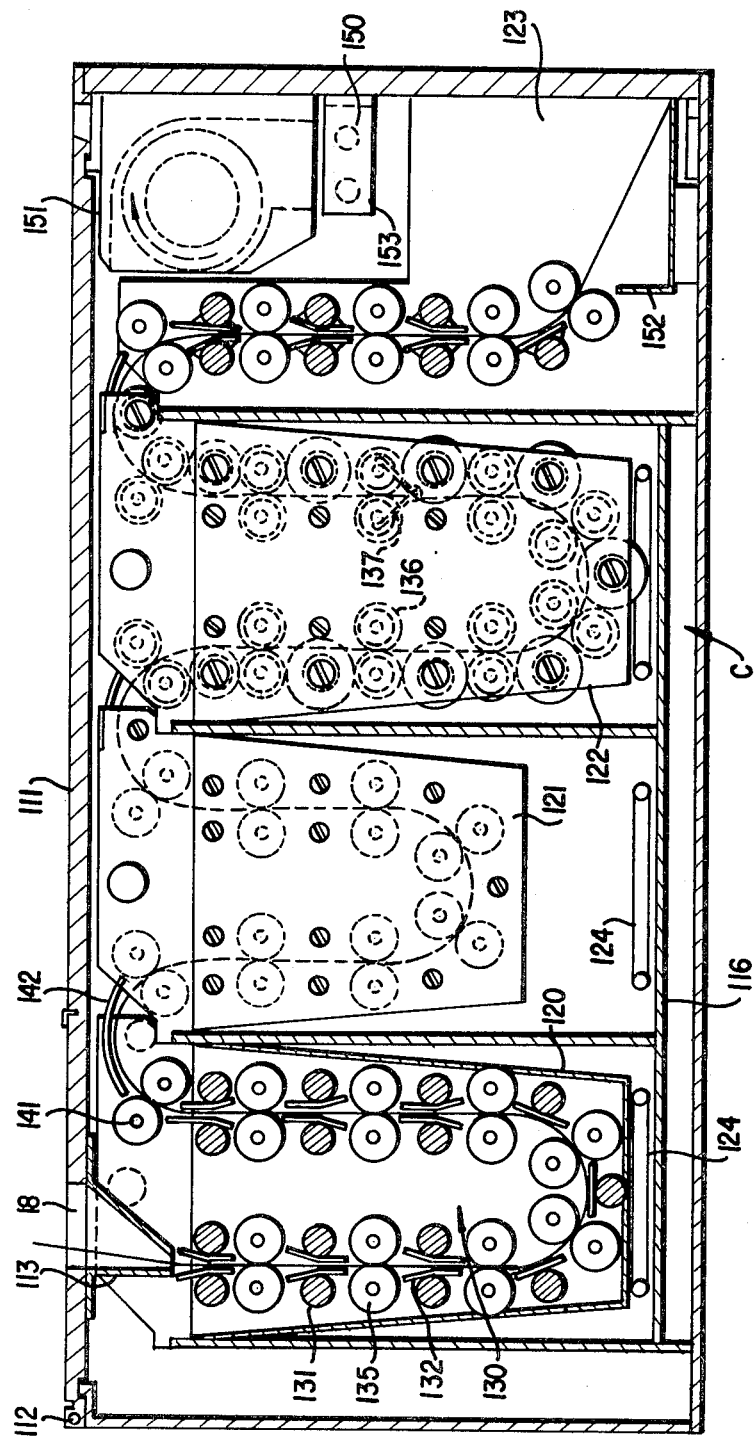
FIG. 6 is a longitudinal partial cross sectional view of the third "development" unit C, positioned parallel to the first unit A and perpendicular to the second unit B.

Referring now to FIG. 6, the development unit C extends parallel to and below the exposure unit A and comprises a housing 116 formed of sheet metal or molded plastic covered by a cover 111 hinged at one end at pivot means 112 to facilitate access to the different processing tanks. Located on cover 111 just below the resting plate 85 and the blade 100 is a funnel 113 (designated by reference numeral 20 in FIG. 1) adapted to recover and provide the passage of the exposed sheet 19 which has been cut by the moving blade 99 (designated by reference numeral 17 in FIG. 1). The vertical walls 103 (FIG. 5) of the frame 74 of the unit B are rigidly connected to the cover 111.

Referring once again to FIG. 6, the housing 116 comprises, in a known manner, essentially four tanks 120, 121, 122 and 123 separated by walls 115 arranged in a predetermined order to receive the developing agent, the bleaching and fixing agent, the wash water and provide the drying section, respectively. Each of the first three tanks 120, 121, 122 has their temperature regulated by a suitable electrical resistor 124. Each tank is separated from the following tank by a partition 115 and has a unit 130 for mounting the drive rollers for conveyance of the cut sheet of exposed paper 19 which is being developed. The unit 130 is secured by cross members 131 which support convergence guides 132 for the sheet of paper 19. Rubber-covered drive rollers 135 driven by gears 136 and held under pressure by a spring 137 advance the sheet within each processing tank. A motor 140 drives the gears 136. At the top of each tank, a train of rollers 141 serves to squeeze the treated sheet and a curved plate 142 provides a guide to facilitate the passage of the sheet from one tank to the next.

The drying section 123 comprises essentially an electrical resistor 150 associated with heat diffusion fins 153, and a fan 151 which causes air drawn in at the top of the tank 123 to be driven over the resistor 150 and pushed downward so as to facilitate circulation of the drying air.

The dried developed photograph is then received in a small box 152 (labelled 25 in FIG. 1) provided for this purpose, from which it can be removed by hand.

The device further comprises a conventional electric control box which in particular assures the following functions:
the connecting of the current,
the control of the view carrier 35 on an individual "view by view" basis or in the alternative by automatic drive, i.e., repetitively,
the control of the illumination of the exposure lamp 1, the adjustment of the regulation 124 of the baths, and a pre-selection counter (optional).

The simultaneous printing and development device of the invention operates in the following manner:
1. Turning on of the current
2. Adjustment of temperature of the development baths
3. Feeding of sensitive paper
4. Positioning and framing of the negative film to be reproduced in the view carrier
5. Adjustment of the filter as a function of the nature of the negative film
6. Selection of the manner of operation (individual or automatic (repetitive))
7. Starting of the cycle itself, which comprises: drying; exposure; advance of the paper; cutting of the exposed paper; and development of this exposed sheet.

The invention offers numerous advantages over the devices marketed to date. Among these are:
its compactness and moderate cost;
the simplicity of its use and operation;
the possibility of rapidly and conveniently changing either the sensitive paper or the view-carrier sub-units;
easy access to the development tanks;
its easy adaptation to the ordinary film sizes, by means of "pluggable" sub-units;
the possibility of processing either color photographs or black and white photographs.

Thus, the integrated, automatic device of the present invention may be effectively utilized to provide concurrent printing and development of photographs, including in particular color photographs.

What is claimed is:

1. An automatic device for simultaneous printing and development of photographs, in particular color photographs, comprising:
an exposure unit comprising first and second sub-units adapted to be plugged into one another, said first sub-unit comprising an exposure lamp, a subtractive filter system and a diffuser extended at one end by conductive pins, said second sub-unit comprising a view-carrier frame for receiving film, an enlargement lens and a first shutter, said second sub-unit being traversed longitudinally by a conductive member, said conductive member comprising a jack adapted to receive said conductive pins of said first sub-unit, and an extension pin adapted to engage said dark-room unit;

a dark-room unit comprising a light impervious housing, a feed member for feeding paper, a primary member for advancing the paper, a planar surface on which the image to be reproduced transmitted from the lens is projected onto the paper, a cutter, a first light impervious slit in said light impervious housing through which said paper emerges, and a supporting frame located below said light impervious housing and comprising top, bottom and side portions, said top portion comprising rims adapted to wedge the light impervious housing therebetween, and a primary second slit coinciding with said first light impervious slit for the passage of paper, said bottom portion comprising an orifice, said side portion comprising a second shutter and a nose-shaped protuberance projecting towards said exposure unit in which the exposure unit is adapted to be inserted and within which said second shutter is pivotable;

a development unit comprising a housing member, a pivotable cover, means for feeding the cut exposed sheet of paper, a series of development bath treatment sections, a drying section, and means intended to advance the cut exposed sheet within said treatment sections and within said drying section, and a funnel which coincides with said orifice for the passage of the cut exposed sheet of paper, said vertical dark-room unit being rigidly connected to said top cover of said development unit, said cover being pivoted to one end of said housing member.

2. An integrated automatic device for the simultaneous printing and development of photographs, particularly color photographs comprising:

an exposure unit comprising an exposure lamp, a subtractive filtering system, a first frame intended to receive film to be reproduced, an enlargement lens and a first shutter;

a dark-room unit comprising means for feeding paper, means for advancing the paper, a planar surface on which an image to be reproduced transmitted from said lens is projected onto the paper, and a cutter;

a development unit comprising means for feeding the paper which has been cut and exposed, a series of development bath processing sections, a drying section, and means for advancing the cut and exposed paper through said processing sections and through said drying section, wherein each of said units can be separated from an adjacent, ajoining unit;

said exposure unit comprises a first sub-unit and a second sub-unit capable of being plugged together, said first sub-unit comprising said exposure lamp, said subtractive filtering system and a diffuser fixed in said first sub-unit by conductive pins;

said second sub-unit comprising said first frame, said enlargement lens, said first shutter, and a conductive member, said conductive member longitudinally traversing said second sub-unit, the conductive member comprising a jack for receiving said conductive pins of said first sub-unit, said conductive member fitting in a protrusion mounted on said dark-room unit.

3. The device according to claim 2, wherein said dark-room unit further comprises:

a roll of paper for said paper feeding means, a first light impervious housing comprising a light impervious slit through which said paper emerges;

a supporting frame arranged below said light impervious housing and comprising a top portion including rims for wedging said light impervious housing within said supporting frame, said supporting frame having associated therewith a primary slit and said light impervious housing having associated therewith a secondary slit which coincides with said primary slit upon wedging said light impervious housing within said supporting frame;

said supporting frame further comprising a primary orifice and said development unit further comprising a funnel aligning with said primary orifice of said supporting frame, permitting passage of the paper which has been cut and exposed; and said dark-room unit further comprising a nose-shaped protuberance projecting toward said exposure unit for fitting said exposure unit therein, said protuberance comprising a pivotable shutter.

4. The device according to claim 2, wherein said means for advancing the paper in the dark-room unit comprises:

a first roller mounted on a pressure drive roller shaft;

a second roller parallelly located to said first roller, whereby the circumference of said first roller and said second roller correspond to a predetermined length of paper to be fed;

a spring for holding said first roller and said second roller together in a pressurized longitudinal contacting manner;

means for driving said first roller, said second roller and said cutter comprising;

a motor;

a motor reducer having pinion transmission;

a horizontal shaft rotatably driven by said pinion transmission;

a crank pin parallelly positioned to said horizontal shaft;

a maltese cross-shaped element located perpendicular to said crank-pin;

a first pinion rigidly connected to said maltese cross-shaped element;

a second pinion fixed to said pressure drive roller shaft and meshing with said first pinion, permitting the feeding of the predetermined length of the paper;

a third roller drivingly connected to said pinion transmission;

a fork drivingly connected to said third roller;

said cutter comprising at least one movable blade and at least one fixed blade for cutting exposed paper, said fork being rigidly connected to said movable blade.

5. The device according to claim 3, wherein said means for advancing the paper in the dark-room unit comprises:

a first roller mounted on a pressure drive roller shaft;

a second roller parallelly located to said first roller, whereby the circumference of said first roller and said second roller corresponds to a predetermined length of paper to be fed;

a spring for holding said first roller and said second roller together in a pressurized longitudinal contacting manner;

means for driving said first roller, said second roller and said cutter comprising;

a motor;

a motor reducer having a pinion transmission;

a horizontal shaft rotatably driven by said pinion transmission;
a crank pin parallelly positioned to said horizontal shaft;
a maltese cross-shaped element located perpendicular to said crank-pin;
a first pinion rigidly connected to said maltese cross-shaped element;
a second pinion fixed to said pressure drive roller shaft and meshing with said first pinion, permitting the feeding of the predetermined length of the paper;
a third roller drivingly connected to said pinion transmission;
a fork drivingly connected to said third roller;
said cutter comprising at least one movable blade and at least one fixed blade for cutting exposed paper, said fork being rigidly connected to said movable blade.

* * * * *